(12) United States Patent
Kim et al.

(10) Patent No.: US 12,311,561 B2
(45) Date of Patent: May 27, 2025

(54) AUTOMATED SYSTEM FOR MOUNTING FRONT-END MODULE FOR VEHICLE

(71) Applicants: HYUNDAI MOTOR COMPANY, Seoul (KR); KIA CORPORATION, Seoul (KR)

(72) Inventors: Euihyun Kim, Seoul (KR); Jung Su Gong, Anyang-si (KR); Jeuk Shin, Seoul (KR); Jieun Jang, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 332 days.

(21) Appl. No.: 17/900,114

(22) Filed: Aug. 31, 2022

(65) Prior Publication Data

US 2023/0182312 A1    Jun. 15, 2023

(30) Foreign Application Priority Data

Dec. 13, 2021    (KR) .......................... 10-2021-0177458

(51) Int. Cl.
*B25J 9/16*    (2006.01)
*B25J 9/00*    (2006.01)
*B25J 19/02*   (2006.01)

(52) U.S. Cl.
CPC ........... *B25J 9/1697* (2013.01); *B25J 9/0009* (2013.01); *B25J 9/1687* (2013.01); *B25J 19/023* (2013.01)

(58) Field of Classification Search
CPC ...... B25J 9/1697; B25J 9/0009; B25J 9/1687; B25J 19/023; B25J 9/0084; B25J 15/0014;

(Continued)

(56) References Cited

U.S. PATENT DOCUMENTS

| 5,579,444 A * | 11/1996 | Dalziel | ................. B25J 9/1697 |
| 2003/0019090 A1* | 1/2003 | Matsumoto | ............ B62D 65/02 |

(Continued)

FOREIGN PATENT DOCUMENTS

| EP | 0470939 A1 * | 2/1992 |
| KR | 20100022380 A * | 3/2010 |
| KR | 10-2238040 B1 | 4/2021 |

OTHER PUBLICATIONS

Machine Translation of KR-102238040-B1, Assembly Appratus for Vehicle and Method of Controlling the Same (Year: 2021).*

*Primary Examiner* — Ramon A. Mercado
*Assistant Examiner* — Ellis B. Ramirez
(74) *Attorney, Agent, or Firm* — MCDONNELL BOEHNEN HULBERT & BERGHOFF LLP

(57) ABSTRACT

An automated system for mounting a front-end module (FEM) including a first headlamp assembly and a second headlamp assembly assembled to both sides of a carrier body, and a FEM installation portion of a vehicle body, the automated system includes a FEM gripper mounted on an arm of a first handling robot, a vision sensor mounted on an arm of a second handling robot through a mounting bracket and configured to vision-photograph a first reference portion formed on the vehicle body and a first vehicle body coupling hole formed on the first headlamp assembly and vision-photograph a formed on the vehicle body second a second vehicle body coupling hole formed on reference portion and the second headlamp assembly, while the front-end module is loaded on the FEM installation portion by the FEM gripper, and a controller configured to analyze vision data obtained from the vision sensor and apply a position control signal to the first handling robot.

16 Claims, 15 Drawing Sheets

(58) Field of Classification Search
CPC ......... B25J 15/009; B25J 13/08; B62D 65/02; B62D 65/022; B62D 65/026; B62D 65/028; B62D 65/16; B62D 65/04; B62D 25/085
USPC ........... 700/262, 259, 245; 414/217; 72/293, 72/422; 29/281.4
See application file for complete search history.

(56) References Cited

U.S. PATENT DOCUMENTS

| | | | |
|---|---|---|---|
| 2003/0150094 A1* | 8/2003 | Tashiro | B62D 65/02 |
| 2007/0017081 A1* | 1/2007 | Becker | B25J 9/1684 |
| 2008/0092391 A1* | 4/2008 | Jin | B62D 65/04 |
| 2015/0013132 A1* | 1/2015 | Wang | B62D 65/00 |
| 2016/0308238 A1* | 10/2016 | Ichihara | H01M 8/241 |
| 2018/0015973 A1* | 1/2018 | Nanba | B62D 65/026 |

* cited by examiner

AUTOMATED SYSTEM FOR MOUNTING FRONT-END MODULE FOR VEHICLE

CROSS REFERENCE TO RELATED APPLICATIONS

This application claims priority to and the benefit of Korean Patent Application No. 10-2021-0177458 filed in the Korean Intellectual Property Office on Dec. 13, 2021, the entire contents of which are incorporated herein by reference.

BACKGROUND

(a) Field

The present disclosure relates to an automated system for mounting an assembly component for a vehicle. More particularly, the present disclosure relates to an automated system for automatically mounting a front-end module for a vehicle to a front portion of a vehicle body.

(b) Description of the Related Art

In general, during an assembly process among various production processes for a vehicle, a plurality of assembly components, such as an engine, a transmission, a suspension, a front-end module (FEM), and the like, are assembled to a vehicle body.

The front-end module (FEM) is mounted to a front portion of the vehicle body. The FEM is provided in the form of a module in which a bumper beam, a radiator, and a headlamp are mounted on a FEM carrier.

Conventionally, the FEM may be mounted on a front portion of the vehicle body by using a mounting jig, and it is difficult to manage the gap and the step difference between the head lamp and the fender panel, due to the assembly error of the head lamp and the assembly error of the fender apron.

Therefore, conventionally, the front-end module to which the head lamp is not mounted is first mounted on the front portion of the vehicle body, and then the head lamp is manually mounted to the front-end module in a subsequent process.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an automated system for mounting a front-end module for a vehicle, that is capable of minimizing the assembly deviation of the headlamp with respect to the vehicle body, by mounting a front-end module assembled with the headlamp to a vehicle body.

In addition, the present disclosure provides an automated system for mounting a front-end module for a vehicle capable of automatically mounting multiple types of front-end modules to vehicle bodies of multiple types of vehicles.

An automated system for mounting a front-end module (FEM) for a vehicle according to an embodiment is to mount the front-end module (FEM), including a first headlamp assembly and a second headlamp assembly assembled to both sides of a carrier body, to a FEM installation portion of a vehicle body, and the automated system includes a FEM gripper mounted on an arm of a first handling robot, a vision sensor mounted on an arm of a second handling robot through a mounting bracket and configured to vision-photograph a first reference portion formed on the vehicle body and a first vehicle body coupling hole formed on the first headlamp assembly and vision-photograph a formed on the vehicle body second a second vehicle body coupling hole formed on reference portion and the second headlamp assembly, while the front-end module is loaded on the FEM installation portion by the FEM gripper, and a controller configured to analyze vision data obtained from the vision sensor and apply a position control signal to the first handling robot.

In addition, in an automated system for mounting a front-end module for a vehicle according to an embodiment, the first reference portion may include a first reference hole formed on a first fender portion of the vehicle body.

In addition, in an automated system for mounting a front-end module for a vehicle according to an embodiment, the second reference portion may include a second reference hole formed on a second fender portion of the vehicle body.

In addition, in an automated system for mounting a front-end module for a vehicle according to an embodiment, the controller may be configured to, based on the vision data, calculate a first distance value in a vehicle width direction between a first center line passing through a center of the first reference hole and a second center line passing through a center of the first vehicle body coupling hole.

In addition, in an automated system for mounting a front-end module for a vehicle according to an embodiment, the controller may be configured to calculate a second distance value in the vehicle width direction between a third center line passing through a center of the second reference hole and a fourth center line passing through a center of the second vehicle body coupling hole.

In addition, in an automated system for mounting a front-end module for a vehicle according to an embodiment, the controller may be configured to calculate an average value of the first distance value and the second distance value.

In addition, in an automated system for mounting a front-end module for a vehicle according to an embodiment, the controller may be configured to convert the average value to the position control signal.

In addition, in an automated system for mounting a front-end module for a vehicle according to an embodiment, the vision sensor may be configured to vision-photograph the FEM installation portion of the vehicle body, and output the vision data to the controller.

In addition, in an automated system for mounting a front-end module for a vehicle according to an embodiment, the vision sensor may be configured to vision-photograph the FEM installation portion of the vehicle body, and output the vision data to the controller.

In addition, an automated system for mounting a front-end module for a vehicle according to an embodiment may further include at least one bolt runner installed on the mounting bracket.

In addition, in an automated system for mounting a front-end module for a vehicle according to an embodiment, the at least one bolt runner may include, a first bolt runner fixed on the mounting bracket and disposed in a vehicle length direction, and a second bolt runner installed on the mounting bracket to be movable in a vertical direction, and disposed along the vehicle length direction.

In addition, in an automated system for mounting a front-end module for a vehicle according to an embodiment, the FEM gripper may include a jig frame mounted on the arm of the first handling robot, at least one upper clamper installed on the jig frame and configured to clamp an upper portion of the front-end module, at least one lower damper installed on the jig frame and configured to clamp a lower portion of the front-end module, and at least one pusher installed on the jig frame and configured to pressurize a front portion of the front-end module.

In addition, in an automated system for mounting a front-end module for a vehicle according to an embodiment, the FEM gripper may further include at least one guide pin installed on the jig frame and configured to be inserted into at least one guide hole provided on the front-end module.

In addition, in an automated system for mounting a front-end module for a vehicle according to an embodiment, the at least one upper damper may be installed to be rotatable in a vertical direction by a first driving portion, and may be movable in a vehicle length direction by a second driving portion.

In addition, in an automated system for mounting a front-end module for a vehicle according to an embodiment, the at least one lower damper may be movable in a vertical direction by a third driving portion.

In addition, in an automated system for mounting a front-end module for a vehicle according to an embodiment, the at least one pusher may be movable in a vehicle width direction by a fourth driving portion.

In addition, in an automated system for mounting a front-end module for a vehicle according to an embodiment, the at least one pusher may include a cylinder member disposed in a vehicle length direction, a push rod coupled to the cylinder member to be movable back and forth in the vehicle length direction, a push spring installed in an interior of the cylinder member to elastically support the push rod, and a push pad installed on a front end portion of the push rod.

In addition, in an automated system for mounting a front-end module for a vehicle according to an embodiment, the at least one guide pin may be installed to be movable back and forth in a vehicle length direction by a fifth driving portion, movable in a vehicle width direction by a sixth driving portion, and movable in a vertical direction by a seventh driving portion.

In addition, in an automated system for mounting a front-end module for a vehicle according to an embodiment, the at least one guide pin may include a pin rod portion disposed in a vehicle length direction, and a plurality of hole insertion portions formed at a front end portion of the pin rod portion, in multiple stages having different diameters.

In addition, in an automated system for mounting a front-end module for a vehicle according to an embodiment, the FEM gripper may further include, an attachment member coupled to the at least one lower damper and configured to support the lower portion of the front-end module, and a detecting sensor installed on the at least one lower clamper and configured to detect a position of the attachment member.

In addition, in an automated system for mounting a front-end module for a vehicle according to an embodiment, the attachment member may include at least one attachment rod installed on the at least one lower clamper to be movable in a vertical direction through a holding bracket, an attachment pad coupled to an upper end portion of the attachment rod, and an attachment spring installed on the attachment rod.

In addition, in an automated system for mounting a front-end module for a vehicle according to an embodiment, the detecting sensor may be installed on the holding bracket to correspond to the attachment rod.

According to embodiments of the present disclosure, by automatically adjusting assembly positions of a first headlamp assembly and a second headlamp assembly mounted on a front-end module to a vehicle body, the front-end module may be automatically mounted on the vehicle body, and the assembly productivity of front-end module may be further improved.

Other effects that may be obtained or are predicted by an embodiment will be explicitly or implicitly described in a detailed description of the present disclosure. That is, various effects that are predicted according to an embodiment will be described in the following detailed description.

BRIEF DESCRIPTION OF THE FIGURES

The drawings are intended to be used as references for describing the embodiments of the present disclosure, and the accompanying drawings should not be construed as limiting the technical spirit of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The terminology used herein is for the purpose of describing specific examples only and is not intended to be limiting of the disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. The term "coupled" denotes a physical relationship between two components in which components are directly connected to each other or indirectly through one or more intermediary components.

As used herein, the term "and/or" includes any one or all combinations of one or more related items. In addition, the term "operably connected" or the like means at least two members are directly or indirectly connected with each other. However, two members that are operably connected with each other do not always rotate with the same rotational speed and in the same rotation direction.

In addition, the terms "vehicle", "of a vehicle", "automobile", or other similar terms used herein is intended to include a hydrogen power vehicle. The hydrogen power vehicle covers various vehicles such as passenger vehicles including sports cars, sport utility vehicles (SUVs), buses, trucks, commercial vehicles, and the like.

Hereinafter, an example of the present disclosure is described in detail with reference to the accompanying drawing.

Figure 1:
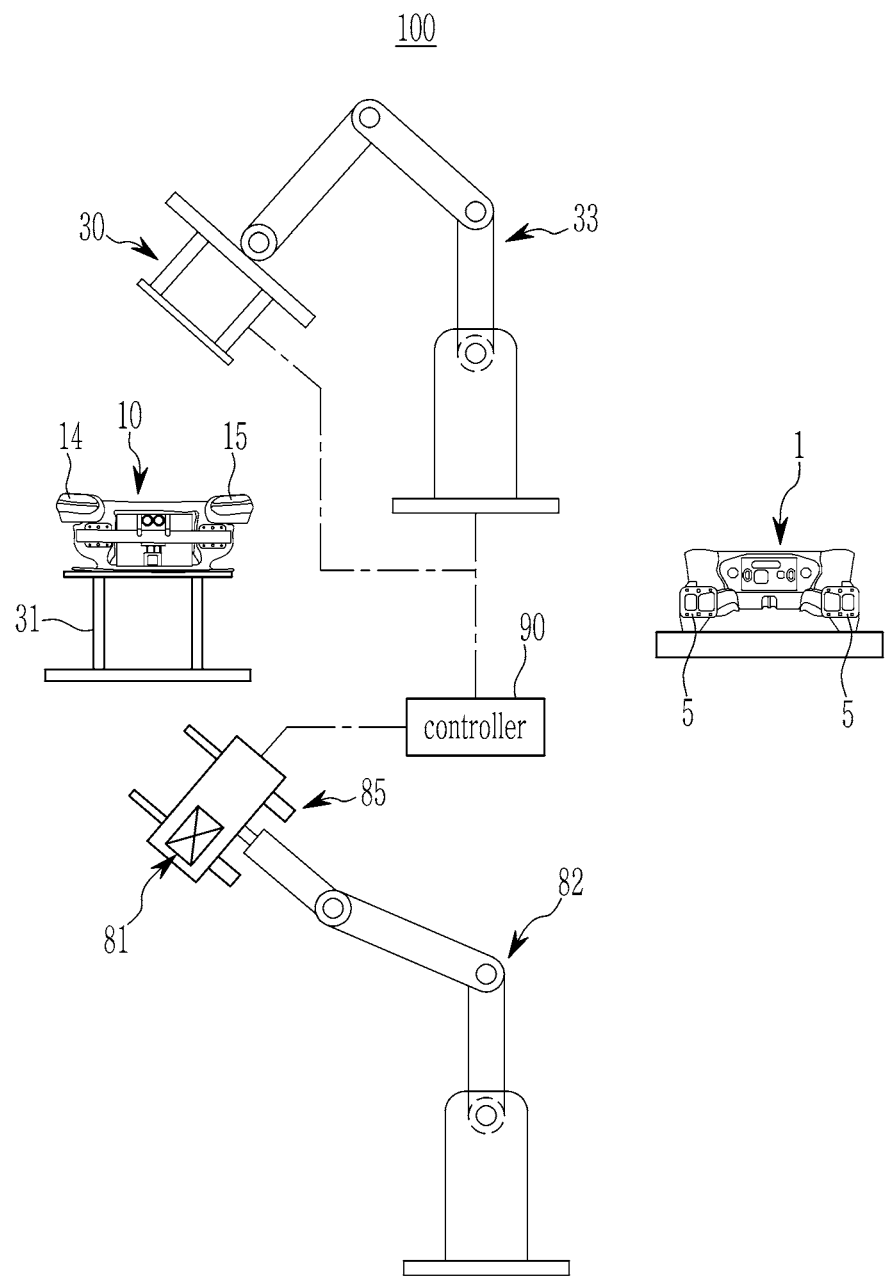
FIG. 1 schematically illustrates an automated system for mounting a front-end module for a vehicle according to an embodiment.

FIG. 1 schematically illustrates an automated system for mounting a front-end module for a vehicle according to an embodiment.

Referring to FIG. 1, an automated system 100 for mounting a front-end module for a vehicle according to an embodiment may be applied to an assembly process for mounting assembly components for a vehicle to a vehicle body 1, in a vehicle production factory.

Furthermore, the automated system 100 for mounting a front-end module for a vehicle according to an embodiment may be applied to a process for mounting a front-end module (FEM) 10 to a front portion of the vehicle body 1, in the assembly process.

Figure 2:
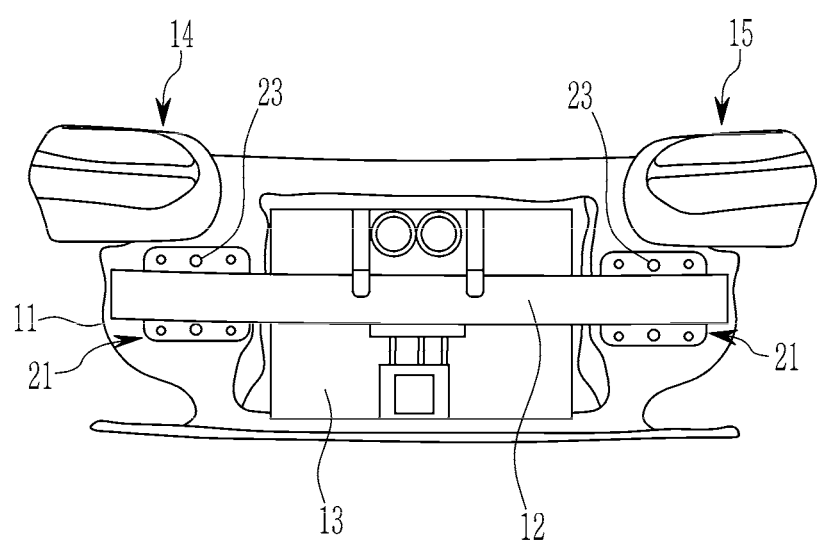
FIG. 2 schematically illustrates a front-end module applied to an embodiment.

FIG. 2 schematically illustrates a front-end module applied to an embodiment.

Referring to FIG. 1 and FIG. 2, the front-end module 10 applied to an embodiment includes a carrier body 11 and a plurality of FEM component parts mounted on the carrier body 11.

In an example, the plurality of FEM component parts may include a front bumper beam 12, a radiator 13, a first headlamp assembly 14, and a second headlamp assembly 15.

Here, the carrier body 11 may be fastened to the front portion of the vehicle body 1 by a fastening member including a bolt. A bumper bracket 21 configured to mount the front bumper beam 12 is installed on the carrier body 11. The bumper bracket 21 includes at least one first guide hole 23.

Furthermore, the first headlamp assembly 14 and the second headlamp assembly 15 are respectively mounted on both upper sides of the carrier body 11. The first headlamp assembly 14 and the second headlamp assembly 15 may be fastened to the front portion of the vehicle body 1.

Figure 3:
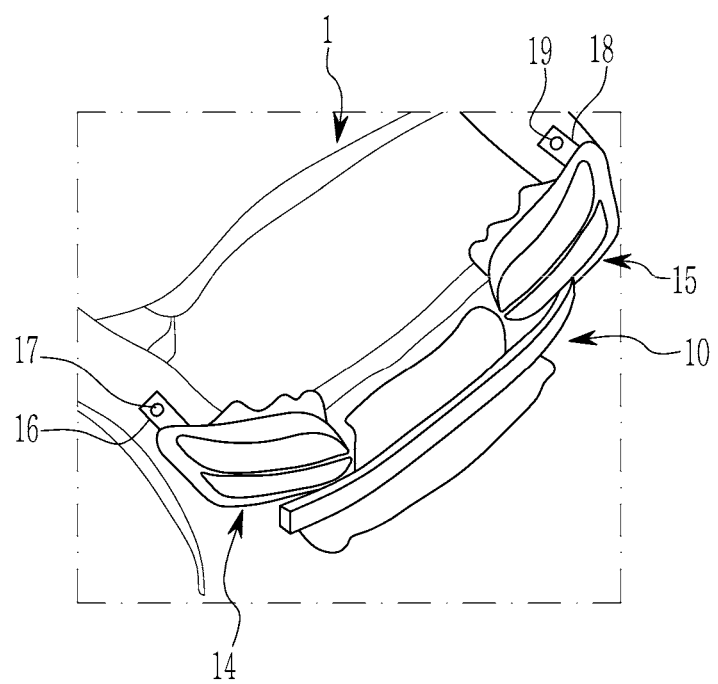
FIG. 3 schematically illustrates a first headlamp assembly and a second headlamp assembly of a front-end module applied to an embodiment.

FIG. 3 schematically illustrates a first headlamp assembly and a second headlamp assembly of a front-end module applied to an embodiment.

Referring to FIG. 3, in the front-end module 10, the first headlamp assembly 14 includes a first vehicle body coupling portion 16 to be fastened to the front portion of the vehicle body 1. A first vehicle body coupling hole 17 is formed on the first vehicle body coupling portion 16.

In addition, in the front-end module 10, the second headlamp assembly 15 includes a second vehicle body coupling portion 18 to be fastened to the front portion of the vehicle body 1. A second vehicle body coupling hole 19 is formed on the second vehicle body coupling portion 18.

Figure 4:
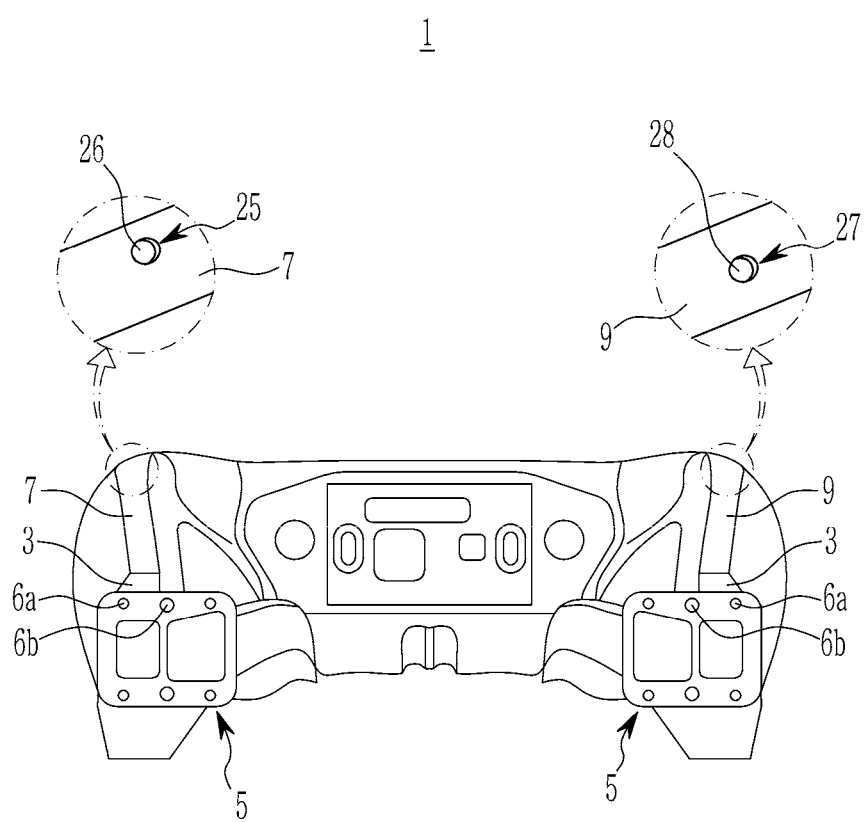
FIG. 4 schematically illustrates a vehicle body applied to an embodiment.

FIG. 4 schematically illustrates a vehicle body applied to an embodiment.

Referring to FIG. 1 to FIG. 4, the vehicle body 1 applied to an embodiment includes a FEM installation portion 5 provided at a front portion of each side member 3. In addition, the vehicle body 1 includes a first fender portion 7 and a second fender portion 9 that respectively extend upward from the front portion of the side member 3.

The FEM installation portion 5 includes at least one FEM coupling hole 6a and at least one second guide hole 6b. Here, the at least one second guide hole 6b may be connected to the at least one first guide hole 23 of the bumper bracket 21.

The first vehicle body coupling portion 16 of the first headlamp assembly 14 is fastened to the first fender portion 7 through the first vehicle body coupling hole 17. In addition, the second vehicle body coupling portion 18 of the second headlamp assembly 15 is fastened to the second fender portion 9 through the second vehicle body coupling hole 19.

Furthermore, the first fender portion 7 includes a first reference portion 25 which serves a mounting reference point for the first headlamp assembly 14. In an example, the first reference portion 25 may include a first reference hole 26.

In addition, the second fender portion 9 includes a second reference portion 27 which serves as a mounting reference point for the second headlamp assembly 15. In an example, the second reference portion 27 may include a second reference hole 28.

Referring to FIG. 1 to FIG. 4, the automated system 100 for mounting a front-end module for a vehicle according to an embodiment is configured to automatically mount the front-end module 10 to the FEM installation portion 5 of the vehicle body 1.

In this disclosure, a vehicle length direction (back and forth direction), a vehicle width direction, and a vertical direction may be taken as reference directions in describing constituent elements of the disclosure.

In this specification, "upper end portion", "upper portion", "upper end", or "upper portion surface" of a component indicates end portion, portion, end, or surface of the component that is relatively positioned higher in the drawing, and "lower end portion", "lower portion", "lower end", or "lower portion surface" of a component indicates end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

The automated system 100 for mounting a front-end module for a vehicle according to an embodiment is structured to minimize the assembly deviation of the first headlamp assembly 14 and the second headlamp assembly 15 that are respectively assembled to the first fender portion 7 of the vehicle body 1 and the second fender portion 9.

In addition, an embodiment provides the automated system 100 for mounting a front-end module for a vehicle capable of mounting the front-end module 10 for multiple types of vehicles to the FEM installation portion 5 of the vehicle body 1.

For such a purpose, the automated system 100 for mounting a front-end module for a vehicle according to an embodiment includes a FEM gripper 30, a vision sensor 81, at least one bolt runner 85, and a controller 90.

In an embodiment, the FEM gripper 30 is configured to grip the front-end module 10 loaded on a pallet 31. In addition, the FEM gripper 30 is configured to load the front-end module 10 on the FEM installation portion 5 of the vehicle body 1.

Here, the pallet 31 is installed on a bottom surface of a process work area. The pallet 31 is configured to support the front-end module 10.

The FEM gripper 30 is mounted on an arm of a first handling robot 33. The first handling robot 33 is installed on the bottom surface of the process work area, and may include a multi joint robot known to a person of an ordinary skill. The first handling robot 33 is capable of moving the FEM gripper 30 along a preset teaching path.

Figure 5:
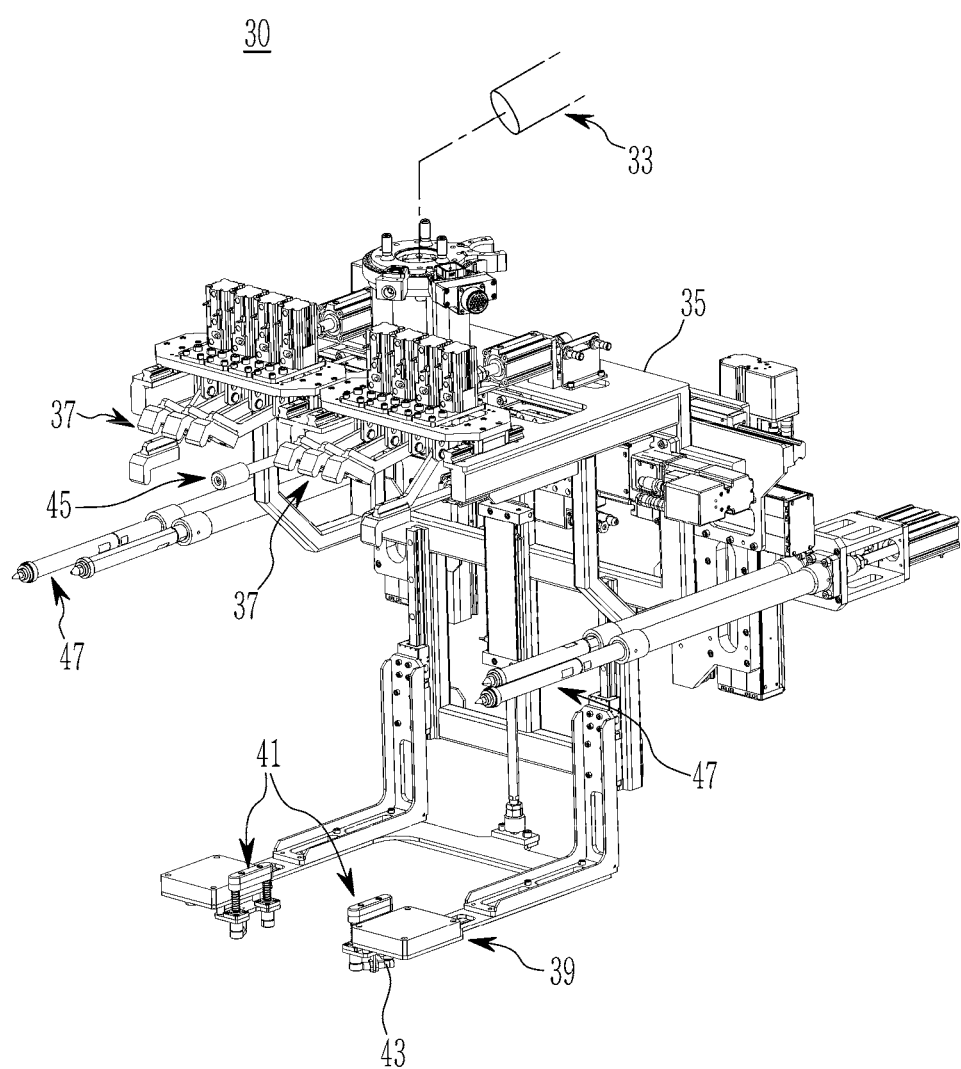
FIG. 5 and FIG. 6 are perspective views that illustrate an FEM gripper applied to an automated system for mounting a front-end module for a vehicle according to an embodiment.
Figure 6:
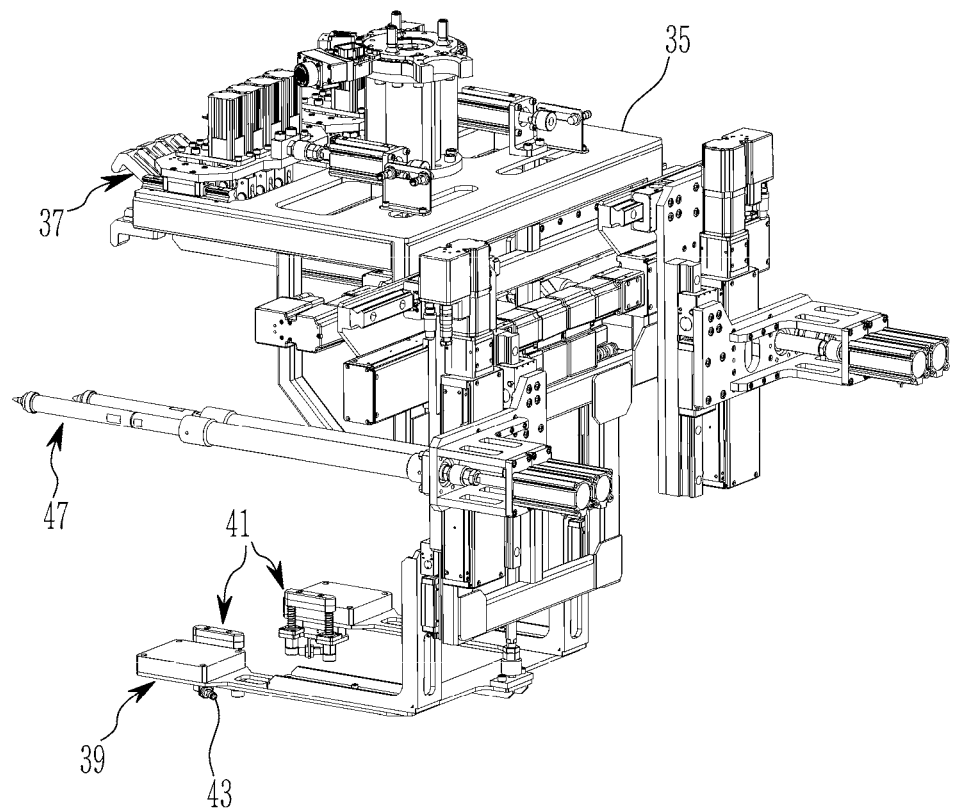

FIG. 5 and FIG. 6 are perspective views that illustrate an FEM gripper applied to an automated system for mounting a front-end module for a vehicle according to an embodiment.

Referring to FIG. 1 to FIG. 6, the FEM gripper 30 according to an embodiment includes a jig frame 35, at least one upper damper 37, at least one lower clamper 39, an attachment member 41, a detecting sensor 43, at least one pusher 45, and at least one guide pin 47.

The jig frame 35 is mounted on the first handling robot 33.

The at least one upper damper 37 is configured to clamp an upper portion of the front-end module 10. The at least one upper damper 37 is installed on an upper portion of the jig frame 35.

Figure 7:
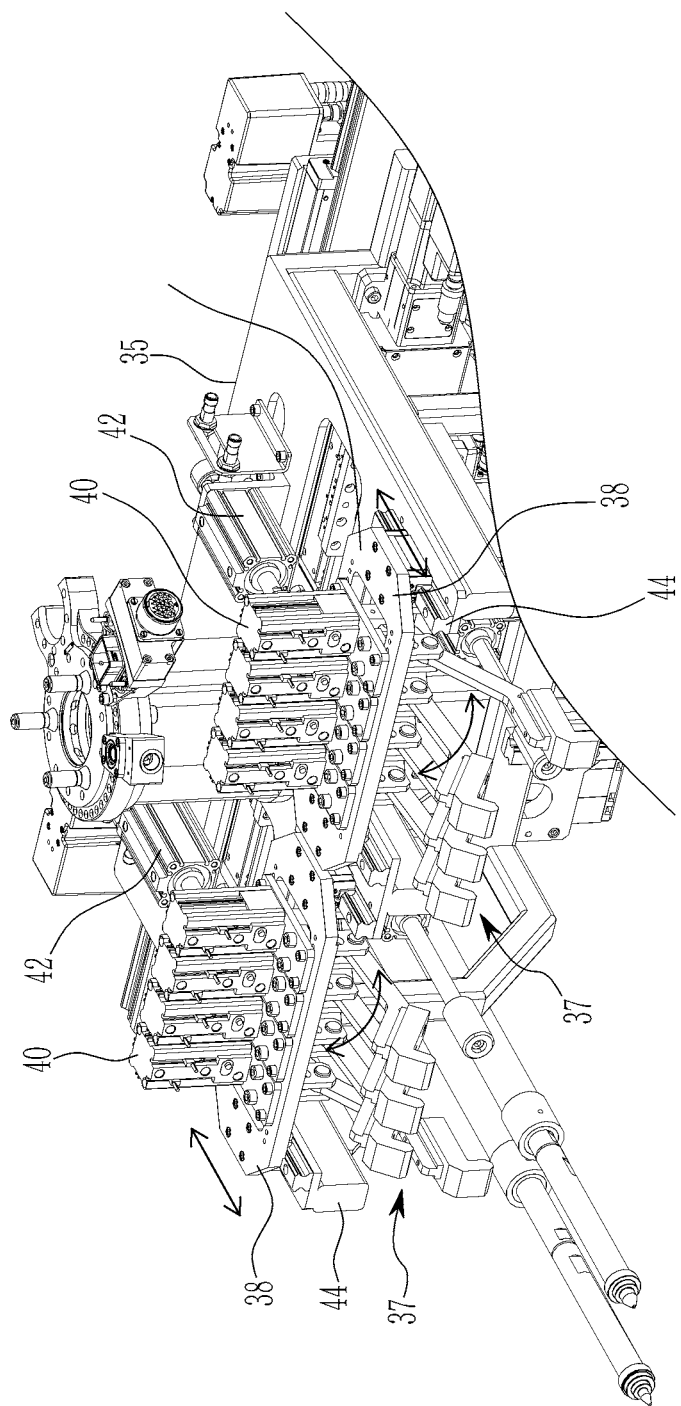
FIG. 7 is a perspective view that illustrates a upper damper portion of an FEM gripper applied to an automated system for mounting a front-end module for a vehicle according to an embodiment.

FIG. 7 is a perspective view that illustrates an upper damper portion of an FEM gripper applied to an automated system for mounting a front-end module for a vehicle according to an embodiment.

Referring to FIG. 7, the at least one upper damper 37 according to an embodiment may be provided to each of a pair of first moving blocks 38, in a plural quantity.

The plurality of upper dampers 37 may be installed on each of the pair of first moving blocks 38 to be rotatable in the vertical direction by a first driving portion 40. The first driving portion 40 is installed on each of the pair of first moving blocks 38. The first driving portion 40 is operably connected to each of the plurality of upper dampers 37. The first driving portion 40 may include an operation cylinder or servo-motor known to a person of an ordinary skill.

Furthermore, each of the pair of first moving blocks 38 provided with the plurality of upper dampers 37 may move in the vehicle length direction by a second driving portion 42. The second driving portion 42 is installed on the upper portion of the jig frame 35. The second driving portion 42 is operably connected to each of the pair of first moving blocks 38. The second driving portion 42 may include an operation cylinder or servo-motor known to a person of an ordinary skill.

Here, each of the pair of first moving blocks 38 is slidably coupled with a plurality of first guide rails 44 disposed on the upper portion of the jig frame 35 along the vehicle length direction. Each of the pair of first moving blocks 38 may move back and forth in the vehicle length direction along the plurality of first guide rails 44 by the second driving portion 42.

Referring to FIG. 1 to FIG. 6, the at least one lower clamper 39 according to an embodiment is configured to clamp a lower portion of the front-end module 10. The at least one lower clamper 39 is installed on a lower portion of the jig frame 35.

Figure 8:
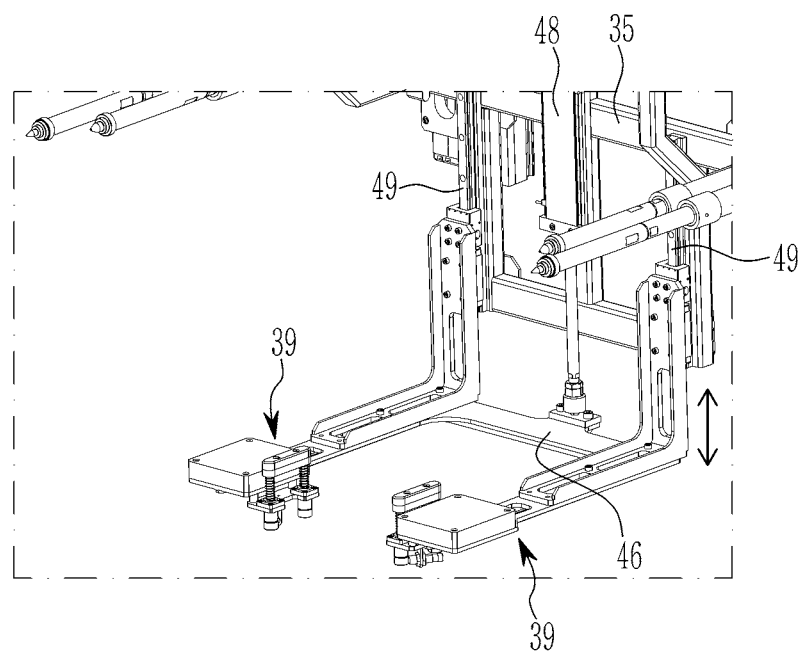
FIG. 8 is a perspective view that illustrates a lower damper portion of an FEM gripper applied to an automated system for mounting a front-end module for a vehicle according to an embodiment.

FIG. 8 is a perspective view that illustrates a lower damper portion of an FEM gripper applied to an automated system for mounting a front-end module for a vehicle according to an embodiment.

Referring to FIG. 8, in an example, the at least one lower damper 39 according to an embodiment may be provided as a pair to a damper bracket 46.

A pair of lower clampers 39 installed on the damper bracket 46 may move in the vertical direction by a third driving portion 48. The third driving portion 48 is installed on the lower portion of the jig frame 35. The third driving portion 48 is operably connected to the damper bracket 46. The third driving portion 48 may include an operation cylinder or servo-motor known to a person of an ordinary skill.

Here, the clamper bracket 46 is slidably coupled with a plurality of second guide rails 49 disposed on the lower portion of the jig frame 35 along the vertical direction. The damper bracket 46 may move in the vertical direction along the plurality of second guide rails 49 by the third driving portion 48.

Referring to FIG. 1 to FIG. 6, the attachment member 41 according to an embodiment is configured to support the lower portion of the front-end module 10 when clamping the lower portion of the front-end module 10 by the at least one lower damper 39. The attachment member 41 is coupled to the at least one lower damper 39.

Figure 9:
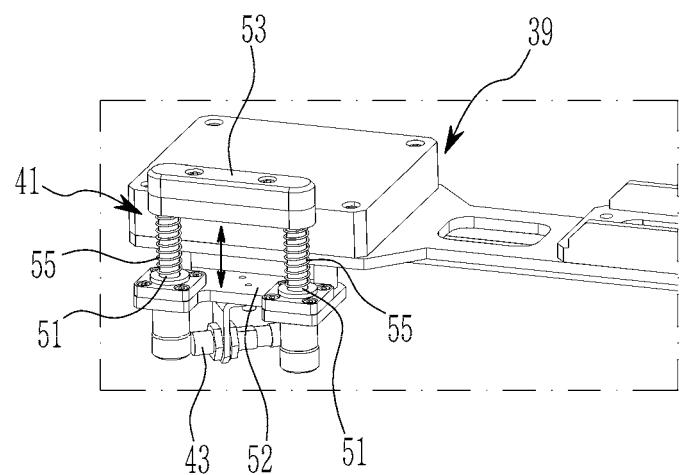
FIG. 9 is a perspective view that illustrates an attachment member and a detecting sensor portion of an FEM gripper applied to an automated system for mounting a front-end module for a vehicle according to an embodiment.

FIG. 9 is a perspective view that illustrates an attachment member and a detecting sensor portion of an FEM gripper applied to an automated system for mounting a front-end module for a vehicle according to an embodiment.

Referring to FIG. 9, the attachment member 41 according to an embodiment includes at least one attachment rod 51, an attachment pad 53, and an attachment spring 55.

In an example, the at least one attachment rod 51 is provided as a pair corresponding to the at least one lower damper 39. The pair of attachment rods 51 is installed on the at least one lower damper 39 to be movable in the vertical direction through a holding bracket 52.

The attachment pad 53 is provided as a rubber pad in the form of block configured to substantially support the lower portion of the front-end module 10. The attachment pad 53 is coupled to upper end portions of the pair of attachment rods 51.

In addition, the attachment spring 55 is configured to elastically support the pair of attachment rods 51. The attachment spring 55 is installed on the pair of attachment rods 51. Here, an upper end of the attachment spring 55 may support a lower portion of the attachment pad 53, and a lower end of the attachment spring 55 may support an upper portion of the holding bracket 52.

Referring to FIG. 9, the detecting sensor 43 according to an embodiment is configured to detect a position of the attachment member 41. The detecting sensor 43 is installed on the at least one lower damper 39.

The detecting sensor 43 is installed (e.g., fixed) on the holding bracket 52 to correspond to one of the pair of attachment rods 51. The detecting sensor 43 may include a position sensor known to a person of an ordinary skill.

Here, the detecting sensor 43 is configured to detect a position of one of the pair of attachment rods 51, when the lower portion of the front-end module 10 is clamped by the at least one lower damper 39. In addition, the detecting sensor 43 is configured to output a detection signal to the controller 90 (refer to FIG. 1) described later in further detail. The detection signal may be a clamping completion signal received by the controller 90.

Referring to FIG. 1 to FIG. 6, the at least one pusher 45 according to an embodiment is configured to pressurize a front portion of the front-end module 10 when the at least one upper damper 37 and the at least one lower damper 39 clamp the upper and lower portions of the front-end module 10.

That is, the at least one pusher 45 may pressurize and stably hold the front portion of the front-end module 10 at the clamping of the at least one upper damper 37 and the at least one lower damper 39. The at least one pusher 45 is installed between upper and lower portions of the jig frame 35.

Figure 10:
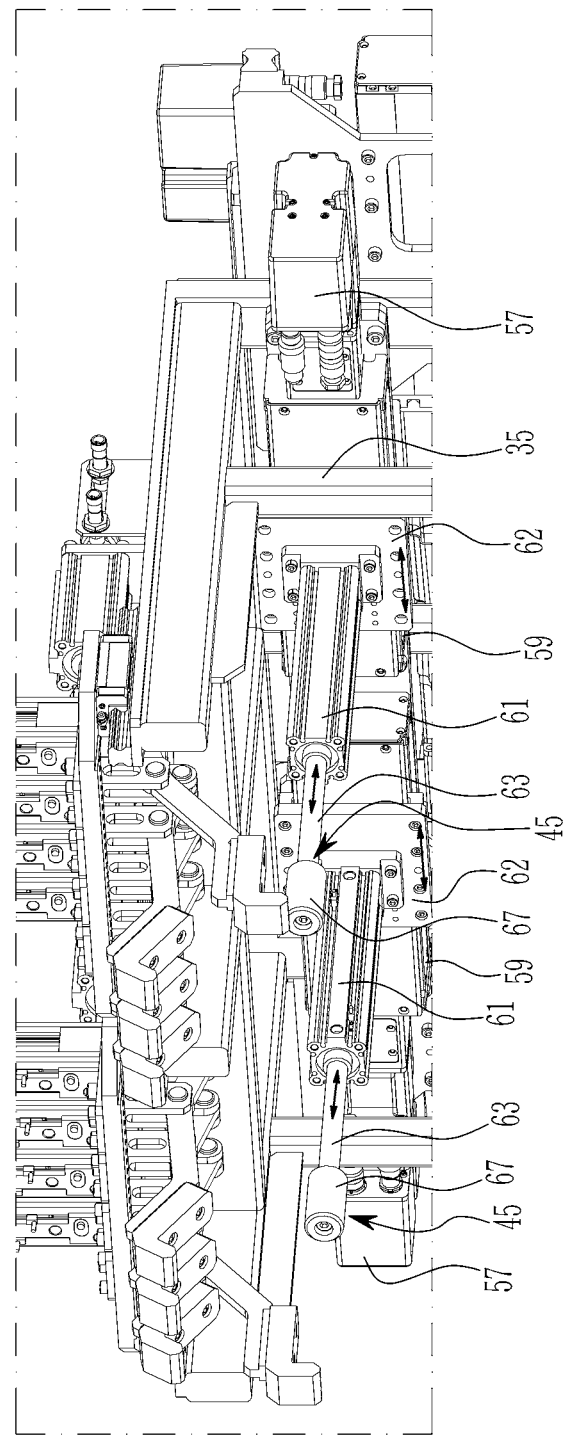
FIG. 10 is a perspective view that illustrates a pusher portion of an FEM gripper applied to an automated system for mounting a front-end module for a vehicle according to an embodiment.
Figure 11:
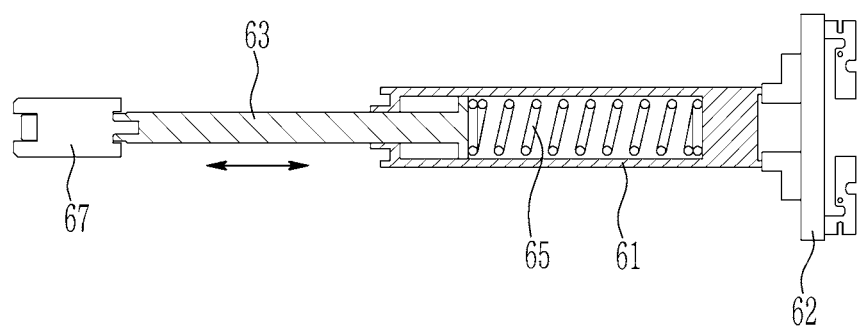
FIG. 11 is a cross-sectional view that illustrates a pusher portion of an FEM gripper applied to an automated system for mounting a front-end module for a vehicle according to an embodiment.

FIG. 10 is a perspective view that illustrates a pusher portion of an FEM gripper applied to an automated system for mounting a front-end module for a vehicle according to an embodiment. FIG. 11 is a cross-sectional view that illustrates a pusher portion of an FEM gripper applied to an automated system for mounting a front-end module for a vehicle according to an embodiment.

Referring to FIG. 10 and FIG. 11, the at least one pusher 45 according to an embodiment is disposed along the vehicle length direction between upper and lower portions of the jig frame 35. In an example, the at least one pusher 45 may be provided as a pair between upper and lower portions of the jig frame 35.

Each of the pair of pushers 45 may be installed to be movable in the vehicle width direction by a fourth driving portion 57. The fourth driving portion 57 is installed between upper and lower portions of the jig frame 35 to correspond to each of the pair of pushers 45. The fourth driving portion 57 is operably connected to each of the pair of pushers 45. The fourth driving portion 57 may include an operation cylinder or servo-motor known to a person of an ordinary skill.

Here, each of the pair of pushers 45 is slidably coupled with a third guide rail 59 disposed along the vehicle width direction between upper and lower portions of the jig frame 35. Each of the pair of pushers 45 may move in the vehicle width direction along the third guide rail 59 by the fourth driving portion 57.

The at least one pusher 45 includes a cylinder member 61, a push rod 63, a push spring 65, and a push pad 67.

The cylinder member 61 is coupled to a second moving block 62 coupled to the third guide rail 59, and disposed along the vehicle length direction. The push rod 63 is coupled to the cylinder member 61 to be movable in the vehicle length direction.

The push spring 65 is installed in an interior of the cylinder member 61 and configured to elastically support the push rod 63. The push pad 67 is provided as a rubber pad in the form of block configured to substantially pressurize the front portion of the front-end module 10. The push pad 67 is coupled to a front end portion of the push rod 63.

Referring to FIG. 1 to FIG. 6, the at least one guide pin 47 according to an embodiment is configured to align the front-end module 10 with a preset position of the pallet 31 when clamping the front-end module 10 loaded on the pallet 31 by the at least one upper damper 37 and the at least one lower damper 39.

In addition, the at least one guide pin 47 is configured to load and align the front-end module 10 gripped by the FEM gripper 30 to a preset position of the FEM installation portion 5 of the vehicle body 1.

In addition, the at least one guide pin 47 may be inserted into the at least one first guide hole 23 of the bumper bracket 21 along the vehicle length direction.

Furthermore, the at least one guide pin 47 may be inserted into the at least one second guide hole 6b of the FEM installation portion 5 along the vehicle length direction, while being inserted the at least one first guide hole 23.

The at least one guide pin 47 is installed between upper and lower portions of the jig frame 35.

Figure 12:
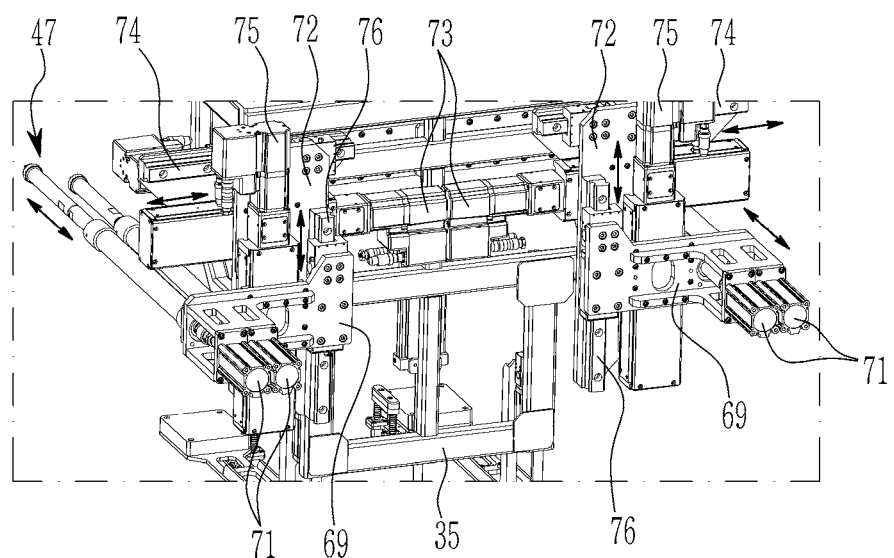
FIG. 12 and FIG. 13 are perspective views that illustrate a guide pin portion of an FEM gripper applied to an automated system for mounting a front-end module for a vehicle according to an embodiment.
Figure 13:
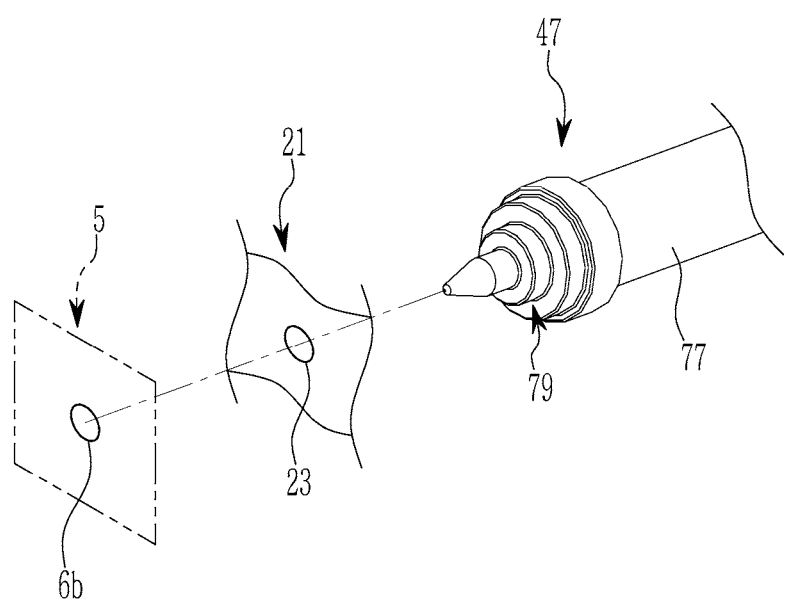

FIG. 12 and FIG. 13 are perspective views that illustrate a guide pin portion of an FEM gripper applied to an automated system for mounting a front-end module for a vehicle according to an embodiment.

Referring to FIG. 12 and FIG. 13, in an example, the at least one guide pin 47 according to an embodiment may be provided, as a pair, at both sides in the vehicle width direction of the jig frame 35.

The pair of guide pins 47 are installed on a third moving block 69 provided respectively at the both sides of the jig frame 35. Each of the pair of guide pins 47 may be installed to be movable back and forth along the vehicle length direction by a fifth driving portion 71. The fifth driving portion 71 is installed on the third moving block 69. The fifth driving portion 71 is operably connected to each of the pair of guide pins 47. The fifth driving portion 71 may include an operation cylinder or servo-motor known to a person of an ordinary skill.

In addition, the third moving block 69 is installed on a fourth moving block 72 provided at the both sides of the jig frame 35. The fourth moving block 72 may move along the vehicle width direction by a sixth driving portion 73. The sixth driving portion 73 is installed on the jig frame 35. The sixth driving portion 73 is operably connected to the fourth moving block 72. The sixth driving portion 73 may include an operation cylinder or servo-motor known to a person of an ordinary skill.

Here, the fourth moving block 72 is slidably coupled with a fourth guide rail 74 disposed on the jig frame 35 along the vehicle width direction. The fourth moving block 72 may move in the vehicle width direction along the fourth guide rail 74 by the sixth driving portion 73.

Furthermore, the third moving block 69 may be installed on the fourth moving block 72 to be movable in the vertical direction. The third moving block 69 may move along the vertical direction by a seventh driving portion 75. The seventh driving portion 75 is installed on the fourth moving block 72. The seventh driving portion 75 is operably connected to the third moving block 69. The seventh driving portion 75 may include an operation cylinder or servo-motor known to a person of an ordinary skill.

Here, the third moving block 69 is slidably coupled with a fifth guide rail 76 disposed on the fourth moving block 72 along the vertical direction. The third moving block 69 may move in the vertical direction along the fifth guide rail 76 by the seventh driving portion 75.

The at least one guide pin 47 includes a pin rod portion 77 and a plurality of hole insertion portions 79.

The pin rod portion 77 is connected to the fifth driving portion 71 mentioned above, and disposed along the vehicle length direction.

In addition, the plurality of hole insertion portions 79 is configured to be inserted into the at least one first guide hole 23 of the bumper bracket 21 and the at least one second guide hole 6b of the FEM installation portion 5, along the vehicle length direction.

The plurality of hole insertion portions 79 may be formed at a front end portion of the pin rod portion 77, in multiple stages having different diameters along the vehicle length direction.

The plurality of hole insertion portions 79 may be universally used to be inserted in to the at least one first guide hole 23 having different sizes according to vehicle types of the front-end module 10.

Referring to FIG. 1 to FIG. 4, in an embodiment, the vision sensor 81 is configured to vision-photograph at least one preset portion of the front-end module 10 loaded on the pallet 31, and output a first vision data to the controller 90.

In addition, the vision sensor 81 is configured to vision-photograph the FEM installation portion 5 of the vehicle body 1 on which the front-end module 10 is to be mounted, and output a second vision data to the controller 90.

Furthermore, while the front-end module 10 is loaded on the FEM installation portion 5 of the vehicle body 1 by the FEM gripper 30, the vision sensor 81 is configured to vision-photograph an assembly portion of the vehicle body 1 and the first headlamp assembly 14 and an assembly portion of the vehicle body 1 and the second headlamp assembly 15, and output a third vision data to the controller 90.

In an example, the vision sensor 81 is configured to vision-photograph the first reference hole 26 formed on the first fender portion 7 of the vehicle body 1 and the first vehicle body coupling hole 17 formed on the first vehicle body coupling portion 16 of the first headlamp assembly 14.

In addition, the vision sensor 81 is configured to vision-photograph the second reference hole 28 formed on the second fender portion 9 of the vehicle body 1 and the second vehicle body coupling hole 19 formed on the second vehicle body coupling portion 18 of the second headlamp assembly 15.

Figure 14:
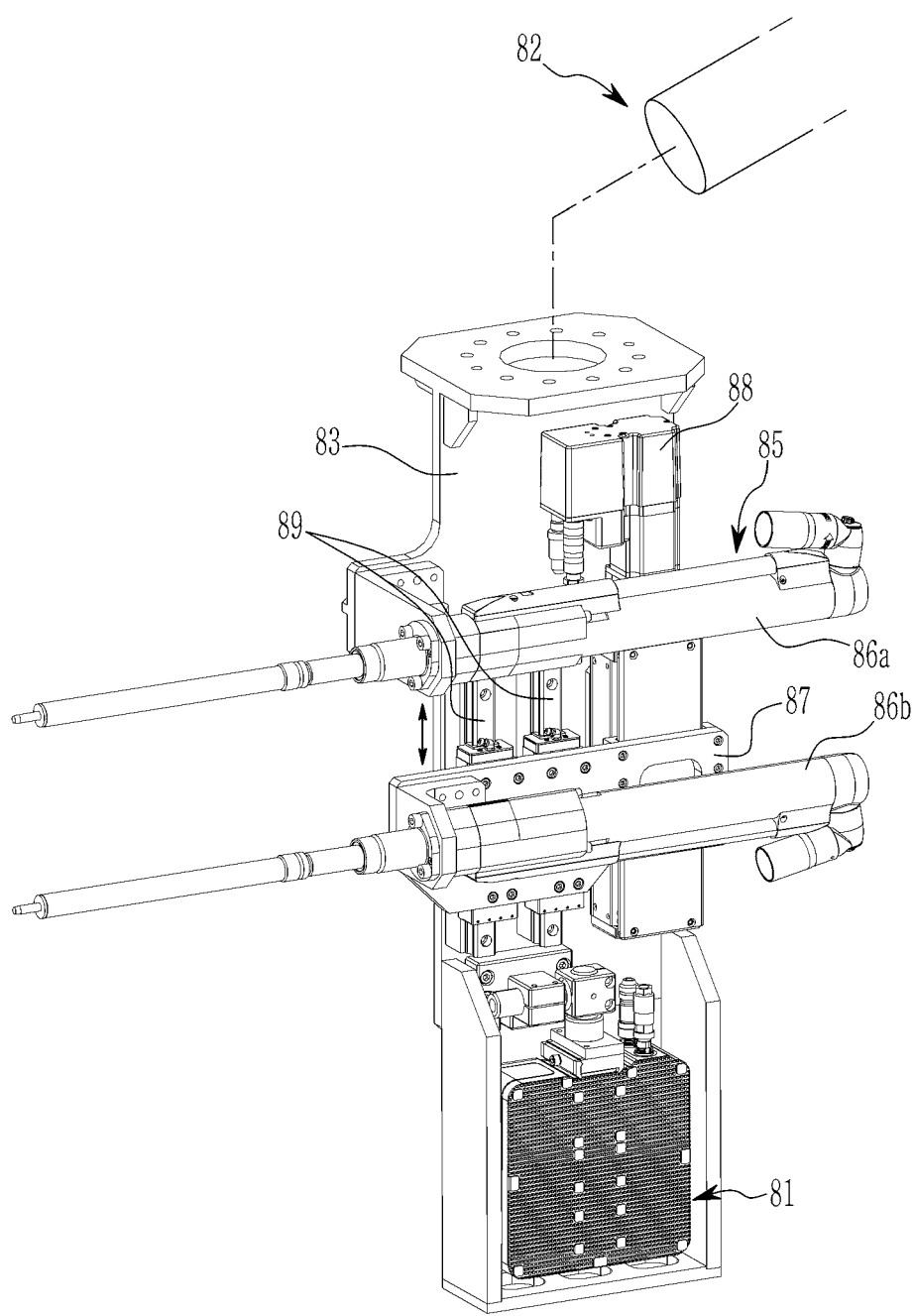
FIG. 14 illustrates a vision sensor and a bolt runner portion applied to an automated system for mounting a front-end module for a vehicle according to an embodiment.

FIG. 14 illustrates a vision sensor and a bolt runner portion applied to an automated system for mounting a front-end module for a vehicle according to an embodiment.

Referring to FIG. 14, the vision sensor 81 according to an embodiment is mounted on an arm of a second handling robot 82 through a mounting bracket 83.

The second handling robot 82 is installed on the bottom surface of the process work area, and may include a multi joint robot known to a person of an ordinary skill. The second handling robot 82 is configured to move the vision sensor 81 along the preset teaching path.

Referring to FIG. 1 to FIG. 4 and FIG. 14, in an embodiment, the at least one bolt runner 85 is configured to bolt-engage the front-end module 10 loaded on the FEM installation portion 5 of the vehicle body 1 by the FEM gripper 30 to the FEM installation portion 5.

The at least one bolt runner 85 is installed on the mounting bracket 83. In an example, the at least one bolt runner 85 is provided as a pair. That is, the at least one bolt runner 85 includes a first bolt runner 86a and a second bolt runner 86b.

The first bolt runner 86a is fixed to the mounting bracket 83, and disposed along the vehicle length direction.

In addition, the second bolt runner 86b is installed on the mounting bracket 83 to be movable in the vertical direction, and disposed along the vehicle length direction.

The second bolt runner 86b may be installed on the mounting bracket 83 to be movable in the vertical direction by a fifth moving block 87. The fifth moving block 87 may move in the vertical direction by an eighth driving portion 88. The eighth driving portion 88 is installed on the mounting bracket 83. The eighth driving portion 88 is operably connected to the fifth moving block 87. The eighth driving portion 88 may include an operation cylinder or servo-motor known to a person of an ordinary skill.

Here, the fifth moving block 87 is slidably coupled with a sixth guide rail 89 disposed on the mounting bracket 83 along the vertical direction. The fifth moving block 87 may move in the vertical direction along the sixth guide rail 89 by the eighth driving portion 88.

Referring to FIG. 1, in an embodiment, the controller 90 is configured to analyze the first vision data, the second vision data, and the third vision data obtained from the vision sensor 81, and apply a position control signal to the first handling robot 33.

For this purpose, the controller 90 may be implemented with at least one processor operated by a set program. In particular, the controller 90 may be implemented with at least one processor that implements image recognition function known to a person of an ordinary skill.

For example, the controller 90 may obtain the first vision data from the vision sensor 81, analyze the first vision data, and apply the position control signal corresponding to an actual position of the front-end module 10 loaded on the pallet 31 to the first handling robot 33.

In addition, the controller 90 may obtain the second vision data from the vision sensor 81, analyze the second vision data, and apply the position control signal corresponding to an actual position of the FEM installation portion 5 of the vehicle body 1 to the first handling robot 33.

Furthermore, the controller 90 may obtain the third vision data from the vision sensor 81, analyze the third vision data, and apply the position control signal corresponding to an adjustment position of the first headlamp assembly 14 and the second headlamp assembly 15 to the first handling robot 33.

Figure 15:
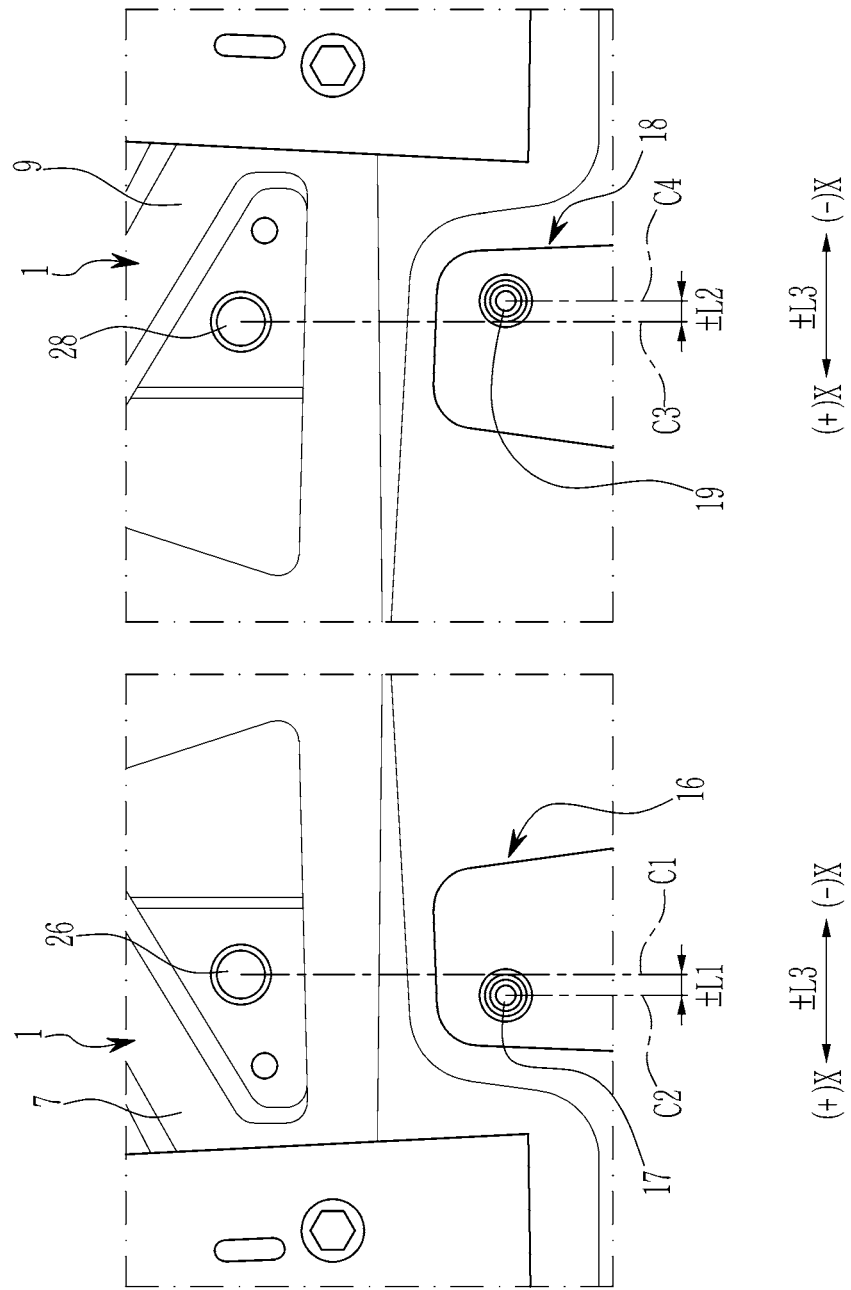
FIG. 15 illustrates an operation of a vision sensor and a controller applied to an automated system for mounting a front-end module for a vehicle according to an embodiment.

FIG. 15 illustrates an operation of a vision sensor and a controller applied to an automated system for mounting a front-end module for a vehicle according to an embodiment.

Referring to FIG. 14 and FIG. 15, based on the third vision data, the controller 90 may apply the position control signal to the first handling robot 33 (refer to FIG. 1) while the front-end module 10 is loaded on the FEM installation portion 5 of the vehicle body 1 by the FEM gripper 30.

In more detail, the controller 90 may calculate a first distance value ±L1 in the vehicle width direction (±X-axis direction) between a first center line C1 passing through a center of the first reference hole 26 formed on the first fender portion 7 of the vehicle body 1 and a second center line C2 passing through a center of the first vehicle body coupling hole 17 formed on the first vehicle body coupling portion 16 of the first headlamp assembly 14 (refer to FIG. 3).

The controller 90 may calculate a second distance value ±L2 in the vehicle width direction (±X-axis direction) between a third center line C3 passing through a center of the second reference hole 28 formed on the second fender portion 9 of the vehicle body 1 and a fourth center line C4 passing through a center of the second vehicle body coupling hole 19 formed on the second vehicle body coupling portion 18 of the second headlamp assembly 15 (refer to FIG. 3).

In addition, the controller 90 may calculate an average value ±L3 of the first distance value ±L1 and the second distance value ±L2, convert the average value ±L3 to the position control signal, and apply the position control signal to the first handling robot 33.

Hereinafter, an operation of the automated system 100 for mounting a front-end module for a vehicle according to an embodiment is described in detail with reference to FIG. 1 to FIG. 15.

First, in the assembly process of assembly components for a vehicle, the front-end module 10 of a preset vehicle type is loaded on the pallet 31. The FEM gripper 30 is mounted on an arm of the first handling robot 33. In addition, the vision sensor 81 and the at least one bolt runner 85 are mounted on an arm of the second handling robot 82 through the mounting bracket 83.

The at least one upper damper 37 of the FEM gripper 30 has been rotated upward by the operation of the first driving portion 40. In addition, the at least one upper clamper 37 is in a state having been moved to a preset position along the vehicle length direction by the operation of the second driving portion 42, corresponding to the front-end module 10 of a preset vehicle type.

The at least one lower damper 39 of the FEM gripper 30 is in a state having been moved to a preset position along the vertical direction by the operation of the third driving portion 48, corresponding to the front-end module 10 of a preset vehicle type.

The at least one pusher 45 of the FEM gripper 30 is in a state having been moved to a preset position along the vehicle width direction by the operation of the fourth driving portion 57, corresponding to the front-end module 10 of a preset vehicle type.

The at least one guide pin 47 of the FEM gripper 30 is in a state having been moved to a preset position along the vehicle length direction by the operation of the fifth driving portion 71, corresponding to the front-end module 10 of a preset vehicle type.

In addition, the at least one guide pin 47 is in a state having been moved to a preset position along the vehicle width direction by the operation of the sixth driving portion 73, corresponding to the front-end module 10 of a preset vehicle type.

In addition, the at least one guide pin 47 is in a state having been moved to a preset position along the vertical direction by the operation of the seventh driving portion 75, corresponding to the front-end module 10 of a preset vehicle type.

Furthermore, among the at least one bolt runner 85, the first bolt runner 86a is in a state fixed to the mounting bracket 83. In addition, in the at least one bolt runner 85, the second bolt runner 86b is in a state having been moved to a preset position along the vertical direction by the operation of the eighth driving portion 88, corresponding to the front-end module 10 of a preset vehicle type.

In such a state, the vision sensor 81 is moved toward the pallet 31 by the second handling robot 82. Then, the vision sensor 81 vision-photographs at least one preset portion of the front-end module 10 loaded on the pallet 31, and outputs the first vision data to the controller 90.

Accordingly, the controller 90 analyzes the first vision data obtained from the vision sensor 81, and applies the position control signal, corresponding to the actual position of the front-end module 10 loaded on the pallet 31, to the first handling robot 33. Then, the first handling robot 33 moves the FEM gripper 30 toward the pallet 31 along the preset teaching path by the position control signal.

Subsequently, the at least one upper damper 37 of the FEM gripper 30 rotates downward by the operation of the first driving portion 40, and clamps the upper portion of the front-end module 10.

Simultaneously, the at least one lower damper 39 of the FEM gripper 30 moves upward by the operation of the third driving portion 48, and clamps the lower portion of the front-end module 10.

Here, the at least one attachment rod 51 of the attachment member 41 overcomes the elastic force of the attachment spring 55 to move downward, and supports the lower portion of the front-end module 10 through the attachment pad 53.

At this time, the detecting sensor 43 detects a position of the at least one attachment rod 51, and outputs the detection signal to the controller 90. Then, the controller 90 converts the detection signal to the clamping completion signal, and applies the clamping completion signal to the second handling robot 82.

During these processes, the at least one pusher 45 of the FEM gripper 30 pressurizes the front portion of the front-end module 10 to stably hold the front-end module 10. At this time, the push rod 63 of the at least one pusher 45 overcomes the elastic force of the push spring 65, and moves into an inside of the cylinder member 61. Accordingly, the push rod 63 pressurizes the front portion of the front-end module 10 through the push pad 67 by the elastic force of the push spring 65.

Simultaneously, the at least one guide pin 47 of the FEM gripper 30 moves forward along the vehicle length direction by the operation of the fifth driving portion 71. Then, the at least one guide pin 47 inserts the plurality of hole insertion portions 79 into the at least one first guide hole 23 of the bumper bracket 21 through the pin rod portion 77, and aligns the front-end module 10 with the preset position of the pallet 31.

Here, since the plurality of hole insertion portions 79 are formed in the multiple stages having different diameters along the vehicle length direction, the at least one guide pin 47 may be universally used to be inserted into the at least one first guide hole 23 having different sizes according to vehicle types.

Meanwhile, during the process of gripping the front-end module 10 by the FEM gripper 30 as described above, the second handling robot 82 having received the clamping completion signal from the controller 90 moves the vision sensor 81 toward the front portion of the vehicle body 1.

Subsequently, the vision sensor 81 vision-photographs the FEM installation portion 5 of the vehicle body 1, and outputs the second vision data to the controller 90. Then, the controller 90 analyzes the second vision data obtained from the vision sensor 81, and applies the position control signal, corresponding to the actual position of the FEM installation portion 5 of the vehicle body 1, to the first handling robot 33.

Then, the first handling robot 33 moves the FEM gripper 30 having gripped the front-end module 10 toward the FEM installation portion 5 of the vehicle body 1 along the preset teaching path according to the position control signal.

Accordingly, the at least one guide pin 47 inserted into the at least one first guide hole 23 of the bumper bracket 21 is inserted into the at least one first guide hole 23 of the FEM installation portion 5 along the vehicle body direction.

Therefore, the at least one guide pin 47 may load and align the front-end module 10 gripped by the FEM gripper 30 with the preset position of the FEM installation portion 5 of the vehicle body 1.

On the other hand, while the front-end module 10 is loaded on the FEM installation portion 5 of the vehicle body 1, the vision sensor 81 moves toward the front-end module 10 by the second handling robot 82.

Then, the vision sensor 81 vision-photographs the first reference hole 26 formed on the first fender portion 7 of the vehicle body 1 and the first vehicle body coupling hole 17 formed on the first vehicle body coupling portion 16 of the first headlamp assembly 14, and outputs the third vision data to the controller 90.

In addition, the vision sensor 81 vision-photographs the second reference hole 28 formed on the second fender portion 9 of the vehicle body 1 and the second vehicle body coupling hole 19 formed on the second vehicle body coupling portion 18 of the second headlamp assembly 15, and outputs the third vision data to the controller 90.

Accordingly, the controller 90 calculates the first distance value ±L1 in the vehicle width direction (±X-axis direction) between the first center line C1 passing through the center of the first reference hole 26 and the second center line C2 passing through a center of the first vehicle body coupling hole 17.

In addition, the controller 90 calculates the second distance value ±L2 in the vehicle width direction (±X-axis direction) between the third center line C3 passing through the center of the second reference hole 28 and the fourth center line C4 passing through a center of the second vehicle body coupling hole 19.

In addition, the controller 90 calculates the average value ±L3 of the first distance value ±L1 and the second distance value ±L2, converts the average value ±L3 to the position control signal, and applies the position control signal to the first handling robot 33.

Therefore, the first handling robot 33 may move the front-end module 10 by a distance corresponding to the average value ±L3 along the vehicle width direction (±X-axis direction) through the FEM gripper 30.

For example, when the first distance value ±L1 along the vehicle width direction (±X-axis direction) is +2 mm and the second distance value ±L2 along the vehicle width direction (±X-axis direction) is −1 mm, the average value ±L3 becomes +0.5 mm.

Therefore, when the controller 90 applies the position control signal corresponding to the average value ±L3 to the first handling robot 33, the first handling robot 33 may move the front-end module 10 by +0.5 mm along the vehicle width direction (±X-axis direction) through the FEM gripper 30.

Therefore, the first handling robot 33 may adjust an assemble position of the first headlamp assembly 14 and the second headlamp assembly 15 with respect to the first fender portion 7 and the second fender portion 9 of the vehicle body 1.

Further, while the front-end module 10 is correctly positioned on the FEM installation portion 5 of the vehicle body 1 by the FEM gripper 30, the at least one bolt runner 85 is moved toward the front-end module 10 by the second handling robot 82.

Then, the at least one bolt runner 85 moves along the vehicle length direction by the second handling robot 82, and bolt-engages the front-end module 10 to the FEM installation portion 5 of the vehicle body 1.

According to the automated system 100 for mounting a front-end module for a vehicle according to an embodiment, the front-end module 10 mounted with the first headlamp assembly 14 and the second headlamp assembly 15 may be automatically mounted to the front portion of the vehicle body 1.

In addition, according to the automated system 100 for mounting a front-end module for a vehicle according to an embodiment, during the process of mounting the front-end module 10 to the front portion of the vehicle body 1, the assemble position of the first headlamp assembly 14 and the second headlamp assembly 15 may be automatically adjusted with respect to the first fender portion 7 and the second fender portion 9 of the vehicle body 1.

Therefore, the first fender portion 7 and the second fender portion 9 of the vehicle body 1 the automated system 100 for mounting a front-end module for a vehicle according to an embodiment, it is not necessary to pre-mount the front-end module without the headlamp to the vehicle body and then manually mount the headlamp to the front-end module as the post-process, and thereby Therefore, the assembly productivity of the front-end module may be further improved.

In addition, according to the automated system 100 for mounting a front-end module for a vehicle according to an embodiment, an assembly deviation of the first headlamp assembly 14 and the second headlamp assembly 15 that are respectively assembled to the vehicle body 1 may be minimized.

Thereby, according to the automated system 100 for mounting a front-end module for a vehicle according to an embodiment, appearance defects of a vehicle due to a gap or a step between a fender panel and first and second headlamp assemblies 14 and 15 may be prevented.

Furthermore, according to the automated system 100 for mounting a front-end module for a vehicle according to an embodiment, since the front-end module 10 for multiple types of vehicles may be handled to be mounted on the vehicle body 1, flexible productivity for multiple types of vehicles may be improved, and equipment investment costs may be reduced.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. An automated system for mounting a front-end module (FEM) for a vehicle to a FEM installation portion of a vehicle body, the front-end module (FEM) including a first headlamp assembly and a second headlamp assembly assembled to both sides of a carrier body, the automated system comprising:
   a FEM gripper mounted on an arm of a first handling robot;
   a vision sensor mounted on an arm of a second handling robot through a mounting bracket, the vision sensor being configured to vision-photograph a first reference portion formed on the vehicle body and a first vehicle body coupling hole formed on the first headlamp assembly, and to vision-photograph a second reference portion formed on the vehicle body and a second vehicle body coupling hole formed on the second headlamp assembly, wherein the front-end module (FEM) is loaded on the FEM installation portion by the FEM gripper; and a controller configured to analyze vision data obtained from the vision sensor and to apply a position control signal to the first handling robot;

wherein the first reference portion comprises a first reference hole formed on a first fender portion of the vehicle body, and the second reference portion comprises a second reference hole formed on a second fender portion of the vehicle body; and wherein the controller is configured to, based on the vision data:

calculate a first distance value in a vehicle width direction between a first center line passing through a center of the first reference hole and a second center line passing through a center of the first vehicle body coupling hole;

calculate a second distance value in the vehicle width direction between a third center line passing through a center of the second reference hole and a fourth center line passing through a center of the second vehicle body coupling hole;

calculate an average value of the first distance value and the second distance value; and convert the average value to the position control signal, to move the FEM to minimize the average value.

2. The automated system of claim 1, wherein the vision sensor is configured to vision-photograph the front-end module loaded on a pallet, and to output the vision data to the controller.

3. The automated system of claim 2, wherein the vision sensor is configured to vision-photograph the FEM installation portion of the vehicle body, and to output the vision data to the controller.

4. The automated system of claim 1, further comprising at least one bolt runner installed on the mounting bracket.

5. The automated system of claim 4, wherein the at least one bolt runner comprises:

a first bolt runner fixed on the mounting bracket and disposed in a vehicle length direction; and a second bolt runner installed on the mounting bracket to be movable in a vertical direction, and disposed along the vehicle length direction.

6. The automated system of claim 1, wherein the FEM gripper comprises:

a jig frame mounted on the arm of the first handling robot;

at least one upper clamper installed on the jig frame and configured to clamp an upper portion of the front-end module;

at least one lower clamper installed on the jig frame and configured to clamp a lower portion of the front-end module; and at least one pusher installed on the jig frame and configured to pressurize a front portion of the front-end module.

7. The automated system of claim 6, wherein the FEM gripper further comprises at least one guide pin installed on the jig frame and configured to be inserted into at least one guide hole provided on the front-end module.

8. The automated system of claim 6, wherein the at least one upper clamper is rotatable in a vertical direction by a first driving portion, and movable in a vehicle length direction by a second driving portion.

9. The automated system of claim 6, wherein the at least one lower clamper is movable in a vertical direction by a third driving portion.

10. The automated system of claim 6, wherein the at least one pusher is movable in a vehicle width direction by a fourth driving portion.

11. The automated system of claim 6, wherein the at least one pusher comprises:

a cylinder member disposed in a vehicle length direction;

a push rod coupled to the cylinder member to be movable back and forth in the vehicle length direction;

a push spring installed in an interior of the cylinder member to elastically support the push rod; and a push pad installed on a front end portion of the push rod.

12. The automated system of claim 7, wherein the at least one guide pin is movable back and forth in a vehicle length direction by a fifth driving portion, movable in a vehicle width direction by a sixth driving portion, and movable in a vertical direction by a seventh driving portion.

13. The automated system of claim 7, wherein the at least one guide pin comprises:

a pin rod portion disposed in a vehicle length direction; and a plurality of hole insertion portions formed at a front end portion of the pin rod portion, in multiple stages having different diameters.

14. The automated system of claim 6, wherein the FEM gripper further comprises:

an attachment member coupled to the at least one lower clamper and configured to support the lower portion of the front-end module; and a detecting sensor installed on the at least one lower clamper and configured to detect a position of the attachment member.

15. The automated system of claim 14, wherein the attachment member comprises:

at least one attachment rod installed on the at least one lower clamper and movable in a vertical direction through a holding bracket;

an attachment pad coupled to an upper end portion of the attachment rod; and an attachment spring installed on the attachment rod.

16. The automated system of claim 15, wherein the detecting sensor is installed on the holding bracket to correspond to the attachment rod.

* * * * *